(12) United States Patent
Hodgkinson et al.

(10) Patent No.: US 8,083,135 B2
(45) Date of Patent: Dec. 27, 2011

(54) INFORMATION CARD OVERLAY

(75) Inventors: Andrew A. Hodgkinson, Pleasant Grove, UT (US); James M. Norman, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 440 days.

(21) Appl. No.: 12/352,465

(22) Filed: Jan. 12, 2009

(65) Prior Publication Data

US 2010/0176194 A1    Jul. 15, 2010

(51) Int. Cl.
G06K 5/00    (2006.01)
G06K 19/02   (2006.01)

(52) U.S. Cl. .................................. 235/380; 235/488

(58) Field of Classification Search ............ 235/380, 235/375, 383, 488, 492, 493
See application file for complete search history.

(56) References Cited

U.S. PATENT DOCUMENTS

| | | | |
|---|---|---|---|
| 3,614,839 A * | 10/1971 | Thomas et al. | 430/10 |
| 3,949,501 A * | 4/1976 | Andrews et al. | 283/82 |
| 4,153,931 A | 5/1979 | Green et al. | |
| 4,568,403 A * | 2/1986 | Egan | 156/247 |
| 4,730,848 A * | 3/1988 | McCormick | 462/55 |
| 5,073,950 A | 12/1991 | Colbert et al. | |
| 5,485,510 A | 1/1996 | Colbert | |
| 5,546,471 A | 8/1996 | Merjanian | |
| 5,546,523 A | 8/1996 | Gatto | |
| 5,594,806 A | 1/1997 | Colbert | |
| 5,613,012 A | 3/1997 | Hoffman et al. | |
| 5,742,756 A | 4/1998 | Dillaway et al. | |
| 5,848,412 A | 12/1998 | Rowland et al. | |
| 6,028,950 A | 2/2000 | Merjanian | |
| 6,055,595 A | 4/2000 | Tachibana et al. | |
| 6,327,578 B1 | 12/2001 | Linehan | |
| 6,363,488 B1 | 3/2002 | Ginter et al. | |
| 6,481,621 B1 | 11/2002 | Herrendoerfer et al. | |
| 6,513,721 B1 | 2/2003 | Salmre et al. | |
| 6,612,488 B2 | 9/2003 | Suzuki | |
| 6,721,713 B1 | 4/2004 | Guheen et al. | |
| 6,880,155 B2 | 4/2005 | Schwabe et al. | |
| 6,913,194 B2 | 7/2005 | Suzuki | |
| 6,970,836 B1 | 11/2005 | Paltenghe et al. | |
| 7,003,501 B2 | 2/2006 | Ostroff | |

(Continued)

FOREIGN PATENT DOCUMENTS

EP    0917120    5/1999

(Continued)

OTHER PUBLICATIONS

Computer Security Institute; "What InfoCard Is and Isn't"; http://web.archive.org/web/20060423133 805/http:/www.identityblog.com/wp-content/resources/alert.pdf, May 2006 (4 pages).

(Continued)

*Primary Examiner* — Thien M Le
(74) *Attorney, Agent, or Firm* — Marger Johnson & McCollom, P.C.

(57) ABSTRACT

An information card overlay system can include a base card having multiple claims, an overlay card storing an overlay claim, and an overlay module that can be used to apply the overlay card to the base card. A computer-implemented method can include selecting a base card having multiple claims, selecting an overlay card storing an overlay claim, and applying the overlay card to the base card.

20 Claims, 12 Drawing Sheets

U.S. PATENT DOCUMENTS

| | | |
|---|---|---|
| 7,065,786 B2 | 6/2006 | Taguchi |
| 7,103,575 B1 | 9/2006 | Linehan |
| 7,104,444 B2 | 9/2006 | Suzuki |
| 7,210,620 B2 | 5/2007 | Jones |
| 7,225,156 B2 | 5/2007 | Fisher et al. |
| 7,231,369 B2 | 6/2007 | Hirabayashi |
| 7,343,351 B1 | 3/2008 | Bishop et al. |
| 7,353,532 B2 | 4/2008 | Duri et al. |
| 7,360,237 B2 | 4/2008 | Engle et al. |
| 7,416,486 B2 | 8/2008 | Walker et al. |
| 7,444,519 B2 | 10/2008 | Laferriere et al. |
| 7,487,920 B2 | 2/2009 | Sato et al. |
| 7,494,416 B2 | 2/2009 | Walker et al. |
| 7,500,607 B2 | 3/2009 | Williams |
| 7,529,698 B2 | 5/2009 | Joao |
| 7,537,152 B2 | 5/2009 | Chakiris et al. |
| RE40,753 E | 6/2009 | Wang et al. |
| 7,555,460 B1 | 6/2009 | Barkan |
| 7,565,329 B2 | 7/2009 | Lapsley et al. |
| 7,591,424 B2 | 9/2009 | Wang et al. |
| 7,594,258 B2 | 9/2009 | Mao et al. |
| 7,610,040 B2 | 10/2009 | Cantini et al. |
| 7,613,659 B1 | 11/2009 | Hoffman et al. |
| 7,620,177 B2 | 11/2009 | Ibrahim et al. |
| 7,636,941 B2 | 12/2009 | Blinn et al. |
| 7,661,585 B2 | 2/2010 | Joao |
| 7,664,022 B2 | 2/2010 | Hu |
| 7,747,540 B2 | 6/2010 | Cameron et al. |
| 7,771,273 B2 | 8/2010 | Walker et al. |
| 7,788,499 B2 | 8/2010 | Cameron et al. |
| 7,797,413 B2 | 9/2010 | Adelman et al. |
| 7,797,434 B2 | 9/2010 | Blakley et al. |
| 7,831,522 B1 | 11/2010 | Satish et al. |
| 7,860,883 B2 | 12/2010 | Hinton et al. |
| 2001/0007983 A1 | 7/2001 | Lee |
| 2002/0026397 A1 | 2/2002 | Ieta et al. |
| 2002/0029337 A1 | 3/2002 | Sudia et al. |
| 2002/0029342 A1 | 3/2002 | Keech |
| 2002/0046041 A1 | 4/2002 | Lang |
| 2002/0083014 A1 | 6/2002 | Brickell et al. |
| 2002/0095360 A1 | 7/2002 | Joao |
| 2002/0103801 A1 | 8/2002 | Lyons |
| 2002/0116647 A1 | 8/2002 | Mont et al. |
| 2002/0178370 A1 | 11/2002 | Gurevich et al. |
| 2003/0046575 A1 | 3/2003 | Bhogal et al. |
| 2003/0061170 A1 | 3/2003 | Uzo |
| 2003/0126094 A1 | 7/2003 | Fisher et al. |
| 2003/0158960 A1 | 8/2003 | Engberg |
| 2003/0172090 A1 | 9/2003 | Asunmaa et al. |
| 2003/0217140 A1 | 11/2003 | Burbeck et al. |
| 2003/0218062 A1 | 11/2003 | Noriega et al. |
| 2004/0019571 A1 | 1/2004 | Hurwitz et al. |
| 2004/0034440 A1* | 2/2004 | Middlebrook .................. 700/91 |
| 2004/0128392 A1 | 7/2004 | Blakley et al. |
| 2004/0162786 A1 | 8/2004 | Cross et al. |
| 2004/0199475 A1 | 10/2004 | Rivest et al. |
| 2004/0199787 A1 | 10/2004 | Hans et al. |
| 2004/0230831 A1 | 11/2004 | Spelman et al. |
| 2005/0027713 A1 | 2/2005 | Cameron et al. |
| 2005/0033692 A1 | 2/2005 | Jarman et al. |
| 2005/0033968 A1 | 2/2005 | Dupouy et al. |
| 2005/0044423 A1 | 2/2005 | Mellmer et al. |
| 2005/0091543 A1 | 4/2005 | Holtzman et al. |
| 2005/0097550 A1 | 5/2005 | Schwabe et al. |
| 2005/0124320 A1 | 6/2005 | Ernst et al. |
| 2005/0135240 A1 | 6/2005 | Ozugur |
| 2005/0229005 A1 | 10/2005 | Le Saint et al. |
| 2005/0247777 A1 | 11/2005 | Pitroda |
| 2005/0247797 A1 | 11/2005 | Ramachandran |
| 2005/0289080 A1 | 12/2005 | Rhiando |
| 2005/0289341 A1 | 12/2005 | Ritola et al. |
| 2006/0020679 A1 | 1/2006 | Hinton et al. |
| 2006/0136990 A1 | 6/2006 | Hinton et al. |
| 2006/0155993 A1 | 7/2006 | Busboon |
| 2006/0200424 A1 | 9/2006 | Cameron et al. |
| 2006/0206931 A1 | 9/2006 | Dillaway et al. |
| 2006/0224611 A1 | 10/2006 | Dunn et al. |
| 2006/0235796 A1 | 10/2006 | Johnson et al. |
| 2007/0016484 A1 | 1/2007 | Waters et al. |
| 2007/0016943 A1 | 1/2007 | M'Raihl et al. |
| 2007/0043651 A1 | 2/2007 | Xiao et al. |
| 2007/0061567 A1 | 3/2007 | Day et al. |
| 2007/0118449 A1 | 5/2007 | De La Motte |
| 2007/0143835 A1 | 6/2007 | Cameron et al. |
| 2007/0192245 A1 | 8/2007 | Fisher et al. |
| 2007/0203852 A1 | 8/2007 | Cameron et al. |
| 2007/0204168 A1 | 8/2007 | Cameron et al. |
| 2007/0204325 A1 | 8/2007 | Cameron et al. |
| 2007/0208869 A1 | 9/2007 | Adelman et al. |
| 2007/0208940 A1 | 9/2007 | Adelman et al. |
| 2007/0214079 A1* | 9/2007 | Mears .............................. 705/39 |
| 2007/0214429 A1 | 9/2007 | Lyudovyk et al. |
| 2007/0282951 A1 | 12/2007 | Selimis et al. |
| 2007/0294431 A1 | 12/2007 | Adelman et al. |
| 2008/0003977 A1 | 1/2008 | Chakiris et al. |
| 2008/0010675 A1 | 1/2008 | Massacusa et al. |
| 2008/0071808 A1 | 3/2008 | Hardt et al. |
| 2008/0098228 A1 | 4/2008 | Anderson et al. |
| 2008/0140576 A1 | 6/2008 | Lewis et al. |
| 2008/0141339 A1 | 6/2008 | Gomez et al. |
| 2008/0141366 A1 | 6/2008 | Cross et al. |
| 2008/0162297 A1 | 7/2008 | Hershkovitz et al. |
| 2008/0178271 A1 | 7/2008 | Galjjala et al. |
| 2008/0178272 A1 | 7/2008 | Gajjala et al. |
| 2008/0184339 A1 | 7/2008 | Shewchuk et al. |
| 2008/0189778 A1 | 8/2008 | Rowley |
| 2008/0196096 A1 | 8/2008 | Grynberg |
| 2008/0222714 A1 | 9/2008 | Wahl |
| 2008/0229410 A1 | 9/2008 | Felsted et al. |
| 2008/0235144 A1 | 9/2008 | Phillips |
| 2008/0244722 A1 | 10/2008 | Satish et al. |
| 2008/0256594 A1 | 10/2008 | Satish et al. |
| 2008/0263644 A1 | 10/2008 | Grinstein |
| 2008/0289020 A1 | 11/2008 | Cameron et al. |
| 2008/0301784 A1 | 12/2008 | Zhu et al. |
| 2008/0313567 A1 | 12/2008 | Sabin et al. |
| 2009/0013391 A1 | 1/2009 | Ernst |
| 2009/0037920 A1 | 2/2009 | Brown et al. |
| 2009/0077118 A1 | 3/2009 | Doman et al. |
| 2009/0077627 A1 | 3/2009 | Doman et al. |
| 2009/0089625 A1 | 4/2009 | Kannappan et al. |
| 2009/0089870 A1 | 4/2009 | Wahl |
| 2009/0089871 A1 | 4/2009 | Murphy et al. |
| 2009/0099860 A1 | 4/2009 | Karabulut et al. |
| 2009/0125558 A1 | 5/2009 | Suh |
| 2009/0131157 A1* | 5/2009 | Hedrick et al. .................. 463/25 |
| 2009/0138398 A1 | 5/2009 | Cole et al. |
| 2009/0178112 A1 | 7/2009 | Doman et al. |
| 2009/0186701 A1 | 7/2009 | Rowe et al. |
| 2009/0193518 A1 | 7/2009 | Craine |
| 2009/0199284 A1 | 8/2009 | Sanders et al. |
| 2009/0204622 A1 | 8/2009 | Sanders et al. |
| 2009/0205014 A1 | 8/2009 | Doman et al. |
| 2009/0205035 A1 | 8/2009 | Sermersheim et al. |
| 2009/0216666 A1 | 8/2009 | Antao et al. |
| 2009/0241178 A1 | 9/2009 | Burch et al. |
| 2009/0249430 A1 | 10/2009 | Buss et al. |
| 2009/0251749 A1* | 10/2009 | O'Boyle et al. .................. 359/2 |
| 2009/0254476 A1 | 10/2009 | Sharma et al. |
| 2009/0254483 A1 | 10/2009 | Barkan |
| 2009/0260064 A1 | 10/2009 | McDowell et al. |
| 2009/0300512 A1 | 12/2009 | Ahn |
| 2009/0300714 A1 | 12/2009 | Ahn |
| 2009/0300747 A1 | 12/2009 | Ahn |
| 2009/0320095 A1 | 12/2009 | Nanda et al. |
| 2009/0328166 A1 | 12/2009 | Burch et al. |
| 2009/0328198 A1 | 12/2009 | Rothman |
| 2010/0037303 A1 | 2/2010 | Sharif et al. |
| 2010/0274691 A1 | 10/2010 | Hammad et al. |
| 2011/0023103 A1 | 1/2011 | Dietrich et al. |

FOREIGN PATENT DOCUMENTS

| | | |
|---|---|---|
| JP | 11003382 | 1/1999 |
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Cameron, Kim et al; "Design Rationale behind the Identity Metasystem Architecture"; http://www.identityblog.com/, http://research.microsoft.com/~mbj/; Mar. 16, 2006, pp. 1-11.

Chappell, David; "Introducing Windows CardSpace"; Windows Vista Technical Articles, http://msdn2.microsoft.com/en-us/library/aa480189(d=printer).aspx, Apr. 2006, pp. 1-15.

The Higgins Foundation; "Higgins FAQ"; http://www.eclipse.org/higgins/faq.php; printed Aug. 13, 2007; pp. 1-2.

Hoang et al.; "Secure Roaming with Identity Metasystems"; ACM 978-1-60558-006-1; http://portal.acm.org/citation.cfm?id=1373297; 2008, pp. 36-47.

"Components—Eclipsepedia"; http://wiki.eclipse.org/Components; printed Aug. 13, 2007; pp. 1-8.

"Architecture—Eclipsepedia"; http://wiki.eclipse.org/index.php/Architecture; printed Aug. 13, 2007; pp. 1-2.

U.S. Appl. No. 11/395,725, filed Mar. 31, 2006, entitled "Methods and Systems for Multi-Factor Authentication"; This is a commonly owned application that is in the same general field as the invention.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the-other-face-of-token-issuing.aspx+microsoft+age+STS+RP&hl=en&ct=clnk&cd=2&gl=us&client=firefox-a; MSDN Blogs; 2007, pp. 1-7.

"Identity Selector Interoperability Profile specification and companion guides"; Microsoft Download Center; http://www.microsoft.com/downloads/details.aspx?DisplayLang=en&FamilyID=b94817fc-3991-4ddO-8e85-b73e626f6764; Microsoft Corporation; 2007.

Nanda, Arun; Identity Selector Interoperability Profile V1.0; Microsoft Download Center, http://download.microsoft. com/download/1/1/a/11 ac6505-e4cO-4e05-987c-6f1 d31855cd2/Identity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1d31855cd2/Identity-Selector-Interop-Profile-v1-Guide.pdf; Microsoft Corporation; Apr. 2007, pp. 1-74.

Jones, Michael B.; "A Guide to Using the Indentity Selector interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5, 2005; Chapter 8, pp. 147-160.

"PwdHash From Stanford—Generate Passwords by Hashing the URL"; Don't Learn to Hack—Hack to Learn, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 2007, pp. 1-4.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb. 20, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://wvvw.techtree.com/techtree/jsp/article.jsp?print=1&article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 2005), "A Guide to Integrating with InfoCard v1.0", XP007908505, pp. 1-62.

Gralla, Preston; "How the Internet Works"; Millennium Ed. Que, Aug. 1999.

Microsoft Corporation, "Microsofts Vision for an Identity Metasystem" http://msdn.microsoft.com/en-us/library/ms996422.aspx, May 2005, pp. 1-7.

Nagarkar, V., "How to Drag Drop in javascript (Part I)", Internet Article, http://www.codeproject.com/KB/scripting/DragDrip_Part_1_.aspx, Jun. 11, 2006 (12 pages).

Alrodhan, et al., "Addressing privacy issues in CardSpace", 2007, IEEE, pp. 285-291.

Gevers et al., Enhancing Privacy in Identity Management Systems, WPES '07, ACM, Oct. 2007 (4 pages).

Jones, Michael B.; A Guide to Supporting Information Cards within Web Applications and Browsers as of the Information Card Profile V1.0; Microsoft Download Center; http://msdn.microsoft.com/en-us/library/aa480726.aspx; Dec. 2006, pp. 1-13.

White, "How Computers Work, Millenium Edition", 1999, Que Corporation.

* cited by examiner

INFORMATION CARD OVERLAY

CROSS-REFERENCE TO RELATED APPLICATIONS

This application is related to co-pending and commonly owned U.S. patent application Ser. No. 11/843,572, titled "PERFORMING A BUSINESS TRANSACTION WITHOUT DISCLOSING SENSITIVE IDENTITY INFORMATION TO A RELYING PARTY," U.S. patent application Ser. No. 11/843,638, titled "POLICY-BASED AUDITING OF IDENTITY CREDENTIAL DISCLOSURE BY A SECURE TOKEN SERVICE," U.S. patent application Ser. No. 11/843,640, titled "FRAMEWORK AND TECHNOLOGY TO ENABLE THE PORTABILITY OF INFORMATION CARDS," U.S. patent application Ser. No. 11/843,608, titled "CHAINING INFORMATION CARD SELECTORS," and U.S. patent application Ser. No. 11/843,591, titled "CREDENTIAL CATEGORIZATION," all of which were filed on Aug. 27, 2007, and all of which claim the benefit of U.S. Provisional Patent Application Ser. Nos. 60/895,312, 60/895,316, and 60/895,325, which were filed on Mar. 16, 2007. All of the foregoing applications are fully incorporated by reference herein.

This application is also related to co-pending and commonly owned U.S. patent application Ser. No. 12/019,104, titled "PROCESSING HTML EXTENSIONS TO ENABLE SUPPORT OF INFORMATION CARDS BY A RELYING PARTY," filed on Jan. 24, 2008, which claims the benefit of U.S. Provisional Patent Application Ser. No. 60/973,679, filed on Sep. 19, 2007; and is related to co-pending and commonly owned U.S. patent application Ser. No. 12/030,063, titled "INFO CARD SELECTOR RECEPTION OF IDENTITY PROVIDER BASED DATA PERTAINING TO INFO CARDS," filed on Feb. 12, 2008; and is related to co-pending and commonly owned U.S. patent application Ser. No. 12/029,373, titled "VISUAL AND NON-VISUAL CUES FOR CONVEYING STATE OF INFORMATION CARDS, ELECTRONIC WALLETS, AND KEYRINGS," filed on Feb. 11, 2008; and is related to co-pending and commonly owned U.S. patent application Ser. No. 12/054,774, titled "CLAIM CATEGORY HANDLING," filed on Mar. 25, 2008; and is related to co-pending and commonly owned U.S. patent application Ser. No. 12/042,205, titled "PRIVATELY SHARING RELYING PARTY REPUTATION WITH INFORMATION CARD SELECTORS," filed on Mar. 4, 2008; and is related to co-pending and commonly owned U.S. patent application Ser. No. 12/026,775, titled "METHODS FOR SETTING AND CHANGING THE USER CREDENTIAL IN INFORMATION CARDS," filed on Feb. 6, 2008. All of the foregoing applications are fully incorporated by reference herein.

This application is also related to co-pending and commonly owned U.S. patent application Ser. No. 12/038,674, titled "SYSTEM AND METHOD FOR SECURE ACCOUNT RESET UTILIZING INFORMATION CARDS," filed on Feb. 27, 2008; and is related to co-pending and commonly owned U.S. patent application Ser. No. 12/044,816, titled "SYSTEM AND METHOD FOR USING WORKFLOWS WITH INFORMATION CARDS," filed on Mar. 7, 2008; and is related to co-pending and commonly owned U.S. patent application Ser. No. 12/108,805, titled "RESTRICTED USE INFORMATION CARDS," filed on Apr. 24, 2008; and is related to co-pending and commonly owned U.S. patent application Ser. No. 12/112,772, titled "DYNAMIC INFORMATION CARD RENDERING," filed on Apr. 30, 2008; and is related to co-pending and commonly owned U.S. patent application Ser. No. 12/054,137, titled "CARDSPACE HISTORY VALIDATOR," filed on Mar. 24, 2008; and is related to co-pending and commonly owned U.S. patent application Ser. No. 12/111,874, titled "REMOTABLE INFORMATION CARDS," filed on Apr. 29, 2008. All of the foregoing applications are fully incorporated by reference herein.

This application is also related to co-pending and commonly owned U.S. patent application Ser. No. 12/170,384, titled "NON-INTERACTIVE INFORMATION CARD TOKEN GENERATION," filed on Jul. 9, 2008; and is related to co-pending and commonly owned U.S. patent application Ser. No. 12/184,155, titled "SITE-SPECIFIC CREDENTIAL GENERATION USING INFORMATION CARDS," filed on Jul. 31, 2008; and is related to co-pending and commonly owned U.S. patent application Ser. No. 12/248,815, titled "TRUSTED RELYING PARTY PROXY FOR INFORMATION CARD TOKENS," filed on Oct. 9, 2008; and is related to co-pending and commonly owned U.S. patent application Ser. No. 12/201,754, titled "SYSTEM AND METHOD FOR VIRTUAL INFORMATION CARDS," filed on Aug. 29, 2008; and is related to co-pending and commonly owned U.S. patent application Ser. No. 12/360,313, titled "MULTIPLE PERSONA INFORMATION CARDS," filed on Jan. 27, 2009. All of the foregoing applications are fully incorporated by reference herein.

TECHNICAL FIELD

The disclosed technology pertains to using information cards, and more particularly to the use of an information card overlay system such as the application of one or more overlay cards to a base card.

BACKGROUND

When a user interacts with certain sites on the Internet such as service providers, which are also referred to as relying parties, the service provider often expects to know something about the user that is requesting the services of the provider. The typical approach for a service provider is to require the user to log into or authenticate to the service provider's computer system. But this approach, while satisfactory for the service provider, is less than ideal for the user.

For example, the user must remember a username and password for each service provider that expects such information. Given that different computer systems impose different requirements, along with the possibility that another user might have already chosen the same username, the user might not be able to use the same username/password combination for each such computer system. There is also the related problem that, if the user uses the same username/password combination on multiple computer systems, someone who hacks one such computer system would likely be able to access other such computer systems.

It is estimated that an average user has over 100 accounts on the Internet. For users, this is becoming an increasingly frustrating problem to deal with. Passwords and account names are too hard to remember. Second, the user typically has no control over how the service provider uses the information it stores. If the service provider uses the stored information in a way the user does not want, for example, the user has relatively little ability to prevent such abuse—and essentially no recourse after the fact.

In the past few years, the networking industry has developed the concept of information cards to tackle these problems. Information cards are a very familiar metaphor for users and the idea is gaining rapid momentum. Information cards allow users to manage their identity information and control how it is released. This gives users greater convenience in organizing their multiple personae, their preferences, and their relationships with vendors and identity providers. Interactions with on-line vendors are greatly simplified.

A typical information card contains claims (e.g., certain pieces of information pertaining to the user's identity). Claims usually include, but are not limited to, the user's first name, last name, street address, city, state, zip code, email address, home phone number, office phone number, and mobile number.

There are currently two kinds of information cards: personal cards (or self-issued cards) and managed cards (or cards that are issued by an identity provider (IdP) or security token service (STS)). A personal card contains self-asserted identity information. In other words, the person issues the card and is the authority for the identity information it contains. In contrast, the managed card is issued by an identity provider, which provides the identity information and asserts its validity.

When a relying party requests identity information from the user, a tool known as an identity selector or card selector can assist the user in selecting an appropriate information card. For example, the card selector can present to the user one or more information cards that satisfy a given security policy and claim requirements of the relying party. When a managed card is selected, the card selector can communicate with the identity provider to obtain a security token that contains the needed information.

While information card technologies are becoming more widespread in applications, there remain certain problems for which no adequate solutions currently exist. For example, while certain information card claims are static (such as last name, for example), it is not uncommon for a user to have multiple email addresses. Current implementations of card selectors require users to maintain multiple information cards, one for each minor customization of the claim values.

Because the user must maintain multiple instances of the same static data across multiple information cards, a simple change of address or phone number, for example, requires the user to update multiple information cards. This can be a very cumbersome, time-consuming, ineffiecient process. The user also assumes a risk of using outdated information if he or she neglects to make the pertinent change(s) in a particular information card before using it.

Thus, there remains a need for a way to address these and other problems associated with the prior art.

SUMMARY

Implementations of the disclosed technology can advantageously allow a user to select a base card (e.g., a primary information card) and apply one or more minor claim customizations, for example, via a card overlay mechanism (e.g., an ability to overlay the base card with certain modifications using one or more overlay cards). For example, a card selector can allow the user to create a card overlay (e.g., by selecting an overlay card) that provides additional or replacement data values that override corresponding values stored in the base card.

Usage of the overlay data can be advantageously recorded so that, during future interactions between the user and a specific relying party, the card selector can present the same card overlay (e.g., base card and overlay data applied to it) that was used during previous interactions with the relying party. The user can decide to either accept the presented card overlay, revert to just the base card, or pursue a new base overlay, for example.

Embodiments of the disclosed technology can advantageously reduce the number of personal cards a user needs to manage. For example, consider a situation in which the user moves. While the move would necessitate changes in the information card claims (e.g., address and phone number), only the claim values in the base card would need to be changed as virtually all of the user's overlay card could benefit from the single change. Thus, whenever a basic piece of the user's information changes, he or she would only need to update a single information card (i.e., the base card) instead of each of the virtually limitless number of information cards he or she may maintain.

The foregoing and other features, objects, and advantages of the invention will become more readily apparent from the following detailed description, which proceeds with reference to the accompanying drawings.

DETAILED DESCRIPTION

Figure 1:
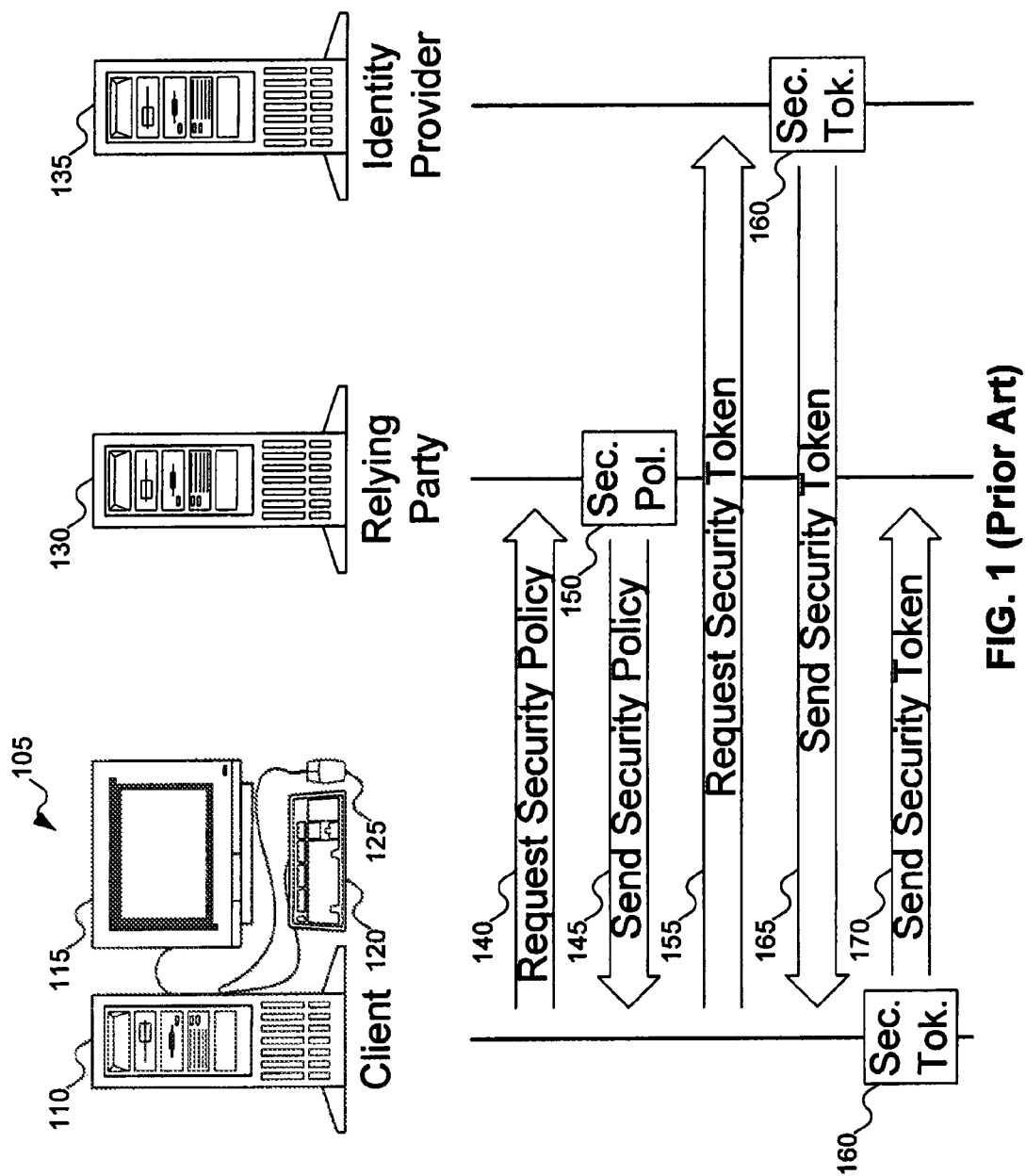
FIG. 1 illustrates an example of a sequence of communications between a client, a relying party, and an identity provider.

Before describing various embodiments of the disclosed technology, it is important to understand the context of the disclosed technology. FIG. 1 shows an example of a sequence of communications between a client, a relying party, and an identity provider. For simplicity, each of the parties (i.e., the client, the relying party, and the identity provider) may be referred to by their respective machines. Actions attributed to each party are taken by that particular party's machine, except where the context indicates that the actions are taken by the actual party itself.

In FIG. 1, a computer system 105 (i.e., the client) is shown as including a computer 110, a monitor 115, a keyboard 120, and a mouse 125. One having ordinary skill in the art will recognize that various other components can be included with the computer system 105, such as other input/output devices (e.g., a printer), for example. In addition, FIG. 1 does not show some of the conventional internal components of the computer system 105, such as a central processing unit, memory, storage, etc. Although FIG. 1 shows the computer system 105 as a conventional desktop computer, one having ordinary skill in the art will recognize that the computer system 105 can be any type of machine or computing device capable of providing the services attributed herein to the computer system 105, including, but not limited to, a laptop computer, a personal digital assistant (PDA), or a cellular telephone, for example.

One having ordinary skill in the art will recognize that the computer system 105 can interact with other computer systems, such as a relying party 130 and an identity provider 135, either directly or over a network of virtually any type.

The relying party 130 is typically a machine managed by a party that relies in some way on the identity of the user of the computer system 105. The operator of the relying party 130 can generally be any type of relying party. For example, the operator of the relying party 130 can be a merchant running a business on a website. Alternatively, the operator of the relying party 130 can be an entity that offers assistance on some matter to registered parties. The relying party 130 is so named because it relies on establishing some identifying information about the user. For purposes of the present application, the relying party 130 can refer to an application residing on and/or running on the computer system 105 itself.

The identity provider 135 is typically managed by a party that is responsible for providing identity information (or other such information) about the user for consumption by the relying party 130. Depending on the type of information that the identity provider 135 stores for a user, a single user might store identifying information with any number of different identity providers 135, any of which might be able to satisfy the request of the relying party 130. For example, the identity provider 135 might be a governmental agency responsible for storing information generated by the government, such as a driver's license number or a social security number. Alternatively, the identity provider 135 might be a third party that is in the business of managing identity information on behalf of a wide variety of users.

Conventional methodology of releasing identity information can be found in a number of sources, such as a document published by Microsoft entitled "Introducing Windows Card-Space," which can be found on the World Wide Web at http://msdn2.microsoft.com/en-us/library/aa480189.aspx and is hereby incorporated by reference. To summarize the operation of Windows CardSpace, when a user wants to access some data from the relying party 130, the computer system 105 requests the security policy of the relying party 130, as shown in a communication 140, which is returned in a communication 145 as a security policy 150. The security policy 150 is typically a summary of the information the relying party 130 needs, how the information should be formatted, and so on.

Once the computer system 105 has the security policy 150, the computer system 105 can identify which information cards will satisfy the security policy 150. Different security policies might result in different information cards being usable. For example, if the relying party 130 simply needs a username and password combination, the information cards that will satisfy this security policy will typically be different from the information cards that satisfy a security policy requesting the user's full name, mailing address, and social security number. The user can then select an information card that satisfies the security policy 150.

A card selector on the computer system 105 can be used by the user to select the appropriate information card. The card selector may present the user with a list or graphical display of all available information cards. Information cards that satisfy the security policy may be highlighted in some way to distinguish them from the remaining cards. Alternatively, the card selector may display only the information cards that will satisfy the security policy. The card selector may provide a means for the user to select the desired information card by, for instance, a mouse click or a touch on a touch screen.

Once the user has selected an acceptable information card, the computer system 105 can use the selected information card to transmit a request for a security token from the identity provider 135, as shown in a communication 155. This request can identify the data to be included in the security token, the credential that identifies the user, and other data the identity provider needs to generate the security token. The identity provider 135 can return a security token 160, as shown in a communication 165.

The security token 160 can include a number of claims (e.g., pieces of information) that typically include data that the user wants to release to the relying party. The security token 160 is usually encrypted in some manner, and perhaps signed and/or time-stamped by the identity provider 135 so that the relying party 130 can be certain that the security token originated with the identity provider 135, as opposed to being spoofed by someone intent on defrauding the relying party 130. The computer system 105 can then forward the security token 160 to the relying party 130, as shown in a communication 170.

In addition, the selected information card can be a self-issued information card (also called a personal card). A self-issued information card typically refers to an information card that is issued not by an identity provider but by the computer system 105 itself. In that case, the identity provider 135 effectively becomes part of the computer system 105.

In this model, a person skilled in the art will recognize that because all information flows through the computer system 105, the user has a measure of control over the release of the user's identity information. The relying party 130 only receives the information the user wants the relying party 130 to have, and generally does not store that information on behalf of the user.

Exemplary Computer System for Implementations of the Disclosed Technology

Figure 2:
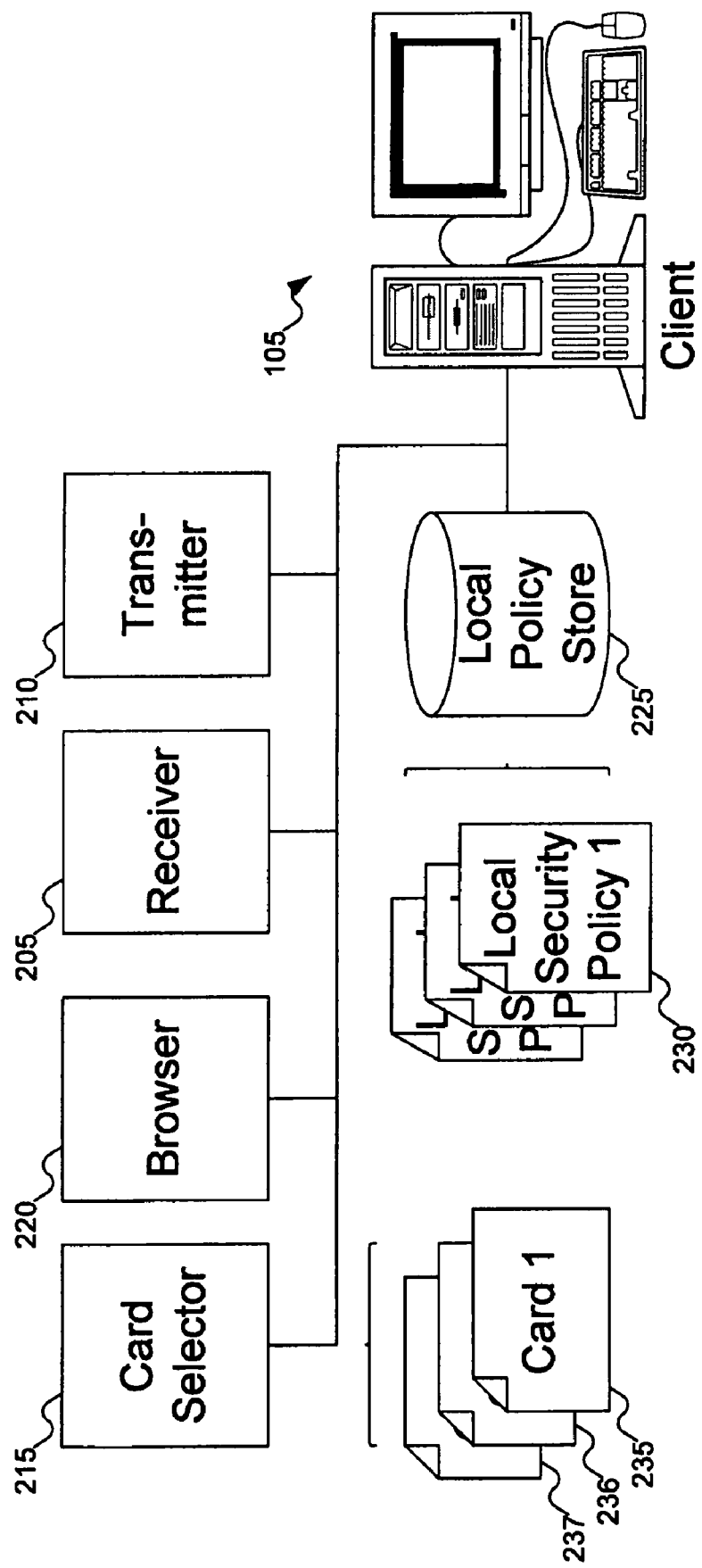
FIG. 2 illustrates an example of a card overlay system implemented within the computer system of FIG. 1.

FIG. 2 shows an example of a card overlay system implemented within the computer system 105. In the example, the computer system 105 includes a receiver 205, a transmitter 210, a card selector 215, and a browser 220. The receiver 205 is generally responsible for receiving data transmitted to the computer system 105, while the transmitter 210 is usually responsible for transmitting information from the computer system 105. The receiver 205 and the transmitter 210 may facilitate communications between the computer system 105, the relying party 130, and the identity provider 135, for example.

The card selector 215 is typically responsible for enabling a user to select an information card that satisfies a particular security policy. The card selector can present the user with a single information card to select or virtually any number of information cards (such as information cards 235-237, for example) from which the user can select a particular one. The card selector 215 is also typically responsible for enabling a user to obtain managed cards from identity providers and to install the managed cards on the computer system 105. Certain implementations of the disclosed technology can include a mapping functionality between the card selector and the identity provider (e.g., to provide support for a base card and/or one or more overlay cards)

The browser 220 can allow the user to interact with web pages on a network, such as web pages created by the identity provider 135. The user may use the browser 220 to obtain a managed card by, for example, visiting a web page created by the identity provider 135 and filling out a web-based form.

The computer system 105 also includes a local policy store 225, which can store local security policies such as local security policy 230. In the example, the local security policy 230 is a local security policy defining how certain information cards (e.g., virtual overlay cards) can be defined and used.

In the example, the card overlay system implemented within the computer system 105 includes the use of a base card (e.g., the first information card 235) and at least one overlay card (e.g., the second and third information cards 236 and 237, respectively). The base card can contain the user's "main" or "default" information (e.g., home phone number) and each overlay card can contain different information for the same items (e.g., mobile or cell phone number instead of home phone number). Thus, the card overlay system can advantageously allow for the selection of a base card to provide all of the pertinent "default" information and at least one overlay card to add, remove, or replace certain information supplied by the base card. In certain embodiments, such actions can be policy-driven.

Exemplary Base and Overlay Cards

Figure 3:
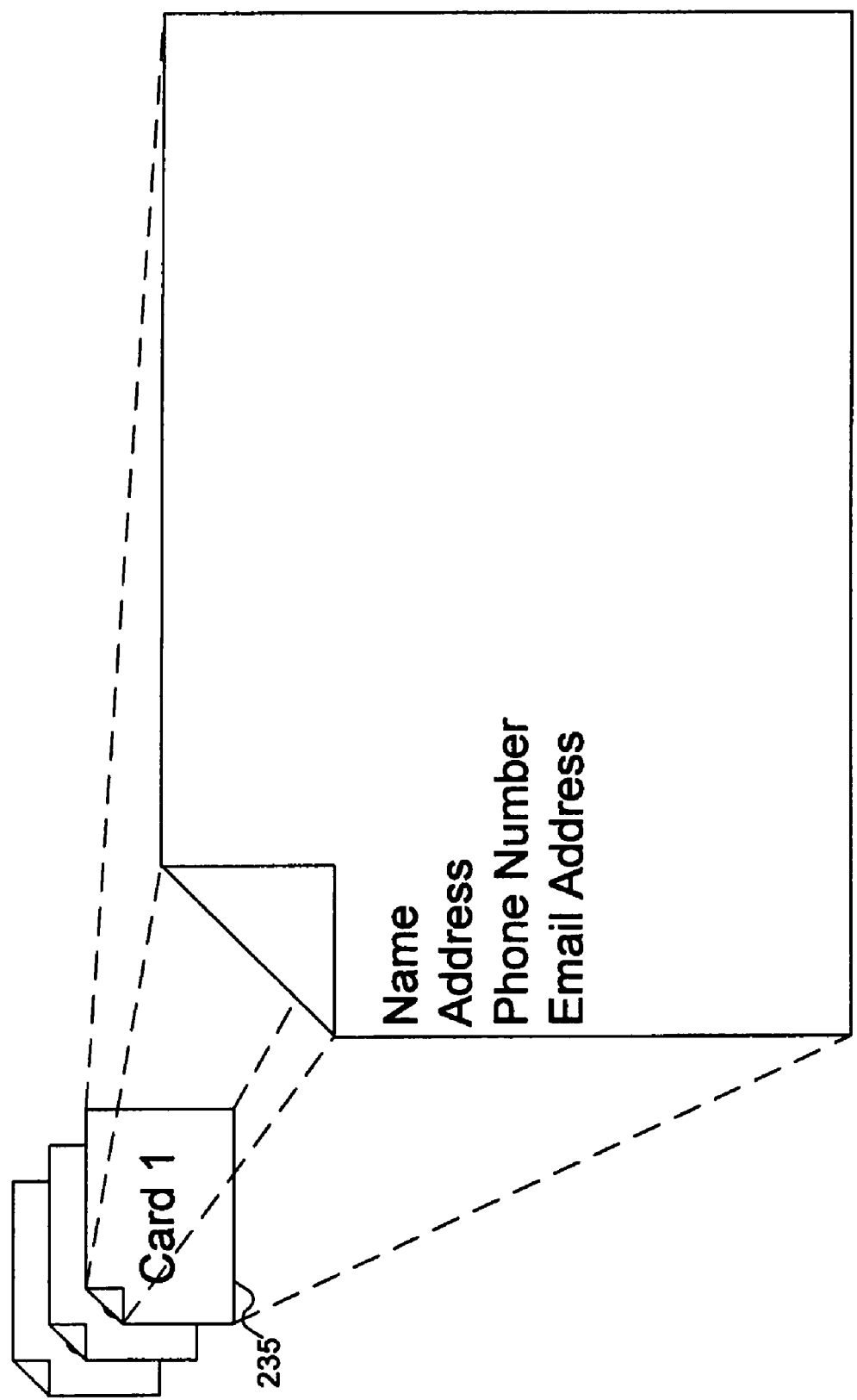
FIG. 3 provides a detailed illustration of the first information card of FIG. 2, which can be used as a base card in certain implementations of the disclosed technology.

FIG. 3 provides a detailed illustration of the first information card 235 of FIG. 2, which can be used as a base card in certain implementations of the disclosed technology. As such, the first information card 235 will also be referred to as the base card 235. However, one having ordinary skill in the art will appreciate that the first information card 235 can be either a base card, an overlay card, or neither, depending on the particular situation.

The base card 235, which can also be referred to as the user's primary card, can be a self-issued card (e.g., stored in a local store of the card selector 215) or a managed card. In certain embodiments where the base card 235 is a managed card, any corresponding overlay cards would typically need to be issued by the same identity provider that issued the base card 235.

The base card 235 can contain some or all of the user's data that is relatively static (e.g., name and address). The base card 235 can contain several different claims, which can each consist of two fields: claim type and claim value. In the example, the base card contains four claims of the following four claim types: name, address, phone number, and email address. Because a base card typically contains the user's "main" or "default" information, the claim values for phone number and email address in the base card 235 are the user's home phone number and primary email address, respectively. In certain embodiments, the base card 235 can also contain information identifying one or more overlay cards that can be applied to the base card 235.

Because virtually any information card can be used as a base card in a particular situation, a user may have multiple base cards. In such cases, a user may designate (or have designated for him or her) a "master" base card. Because such a "master" base card can be used with multiple identity providers, it might not exist as an actual information card for any of the identity provider.

Figure 4:
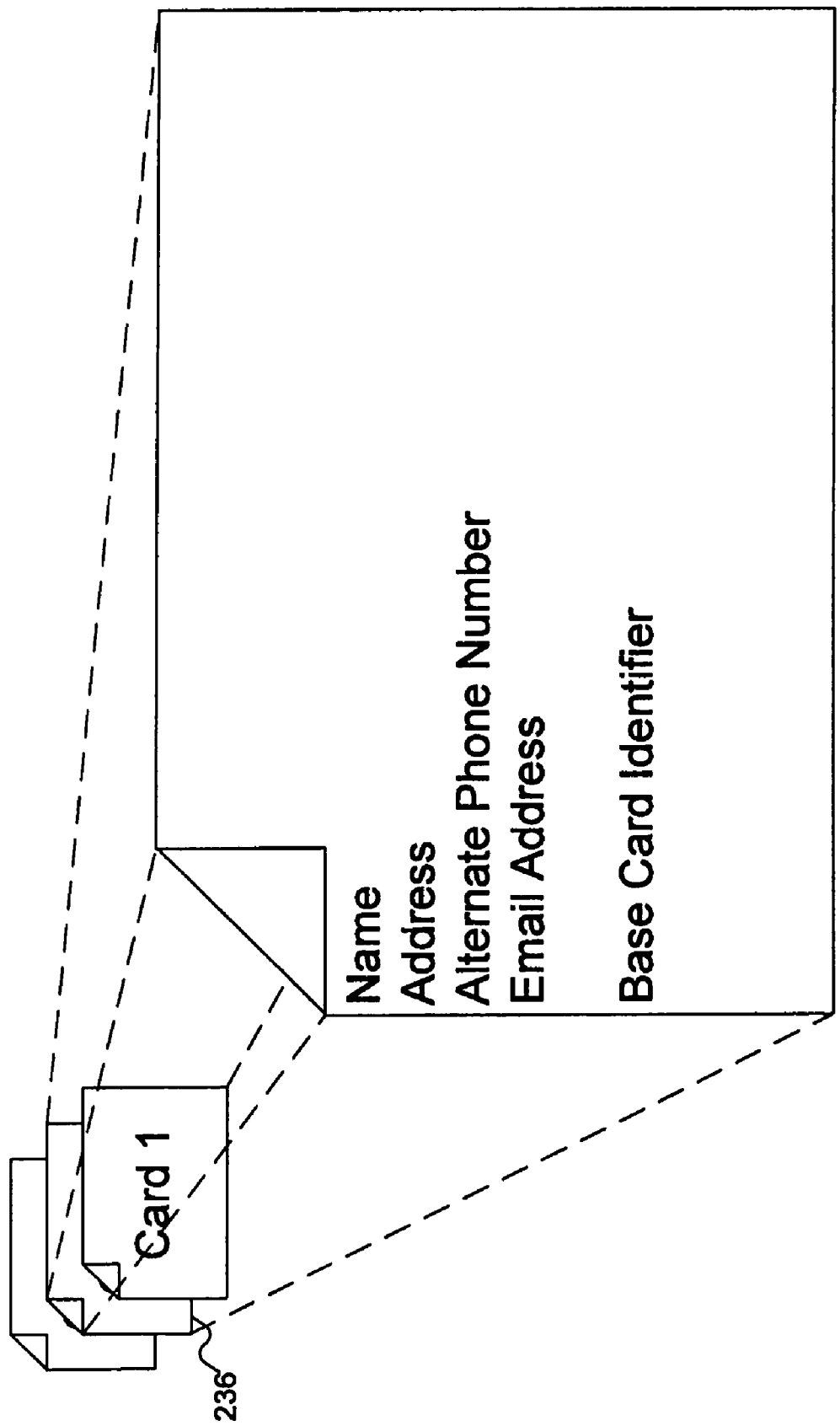
FIG. 4 provides a detailed illustration of the second information card of FIG. 2, which can be used as a first overlay card in certain implementations of the disclosed technology.

FIG. 4 provides a detailed illustration of the second information card 236 of FIG. 2, which can be used as a first overlay card in certain implementations of the disclosed technology. As such, the second information card 236 will also be referred to as the first overlay card 236. However, one having ordinary skill in the art will appreciate that the second information card 236 can be either an overlay card, a base card, or neither, depending on the particular situation.

In the example, the first overlay card 236 contains the same four claim types that are contained within the base card (i.e., name, address, phone number, and email address) with one notable exception: whereas the base card 235 has a claim value corresponding to the user's home phone number for the phone number claim, the claim value for the phone number claim in the first overlay card 236 is an alternate phone number (e.g., the user's mobile number). Thus, in situations where the first overlay card 236 is applied to the base card 235, the user's home phone number will be replaced with his or her alternate phone number as the claim value for the phone number claim.

In addition, the first overlay card 236 of FIG. 4 contains an extra item not found within the base card 235: a base card identifier. In certain embodiments, the base card identifier can indicate which, if any, of the user's information cards can be used as base cards (e.g., to which the first overlay card 236 can be applied). The first overlay card 236 can also contain one or more deltas corresponding to each base card. As used herein, a delta generally refers to a particular piece of information pertaining to which claims have claim values that are different between the first overlay card 236 and the base card 235, as well as to which claims are found in the first overlay card 236 but not in the base card 235.

The first overlay card 236 can also contain information pertaining to one or more identity providers (e.g., name and address of each identity provider). Such information can be used, for example, to override the name and address of an identity provider in the base card 235 with a different identity provider that the user (or card selector) desires to contact (e.g., to request a token based on the set of claims resulting from application of the overlay card 236 to the base card 235).

Figure 5:
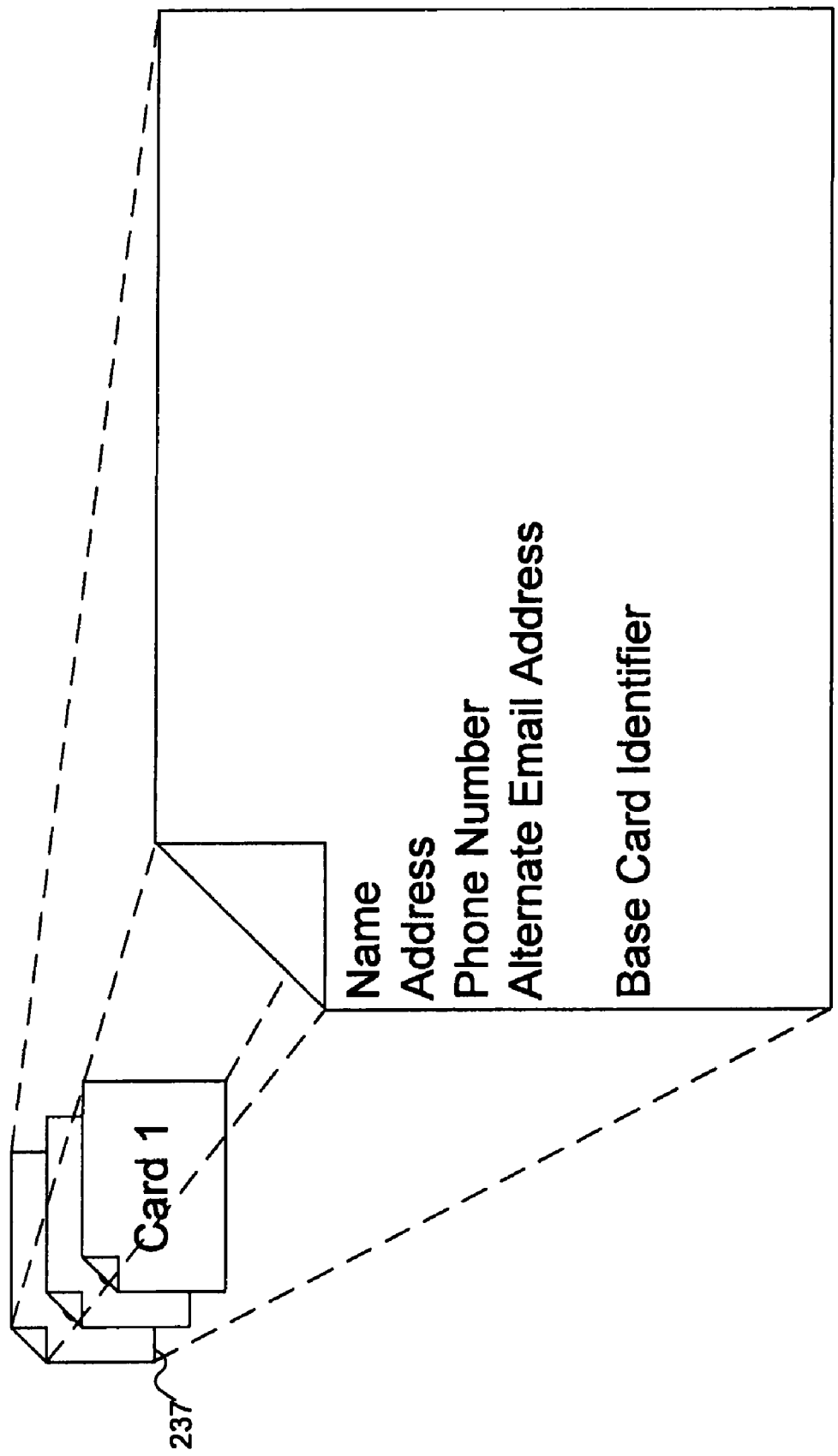
FIG. 5 provides a detailed illustration of the third information card of FIG. 2, which can be used as a second overlay card in certain implementations of the disclosed technology.

FIG. 5 provides a detailed illustration of the third information card 237 of FIG. 2, which can be used as a second overlay card in certain implementations of the disclosed technology. As such, the third information card 237 will also be referred to as the second overlay card 237. However, one having ordinary skill in the art will appreciate that the third information card 237 can be either an overlay card, a base card, or neither, depending on the particular situation.

In the example, the second overlay card 237 contains the same four claim types that are contained within the base card (i.e., name, address, phone number, and email address) with one notable exception: whereas the base card 235 has a claim value corresponding to the user's primary email address for the email address claim, the claim value for the email address claim in the second overlay card 237 is an alternate email address. Thus, in situations where the second overlay card 237 is applied to the base card 235, the user's primary email address will be replaced with his or her alternate email address as the claim value for the email address claim.

In addition, the second overlay card 237 contains an extra item not found within the base card 235: a base card identifier. As with the first overlay card 236, the base card identifier in the second overlay card 237 can indicate which, if any, of the user's information cards can be used as base cards (e.g., to which the second overlay card 237 can be applied). The second overlay card 237 can also contain one or more deltas corresponding to each base card and, in certain embodiments to other overlay cards.

Various implementations involving the use of base cards (e.g., the base card 235) and overlay cards (e.g., the first and second overlay cards 236 and 237, respectively) are described in detail below.

Exemplary Implementations of an Overlay Module

Figure 6:
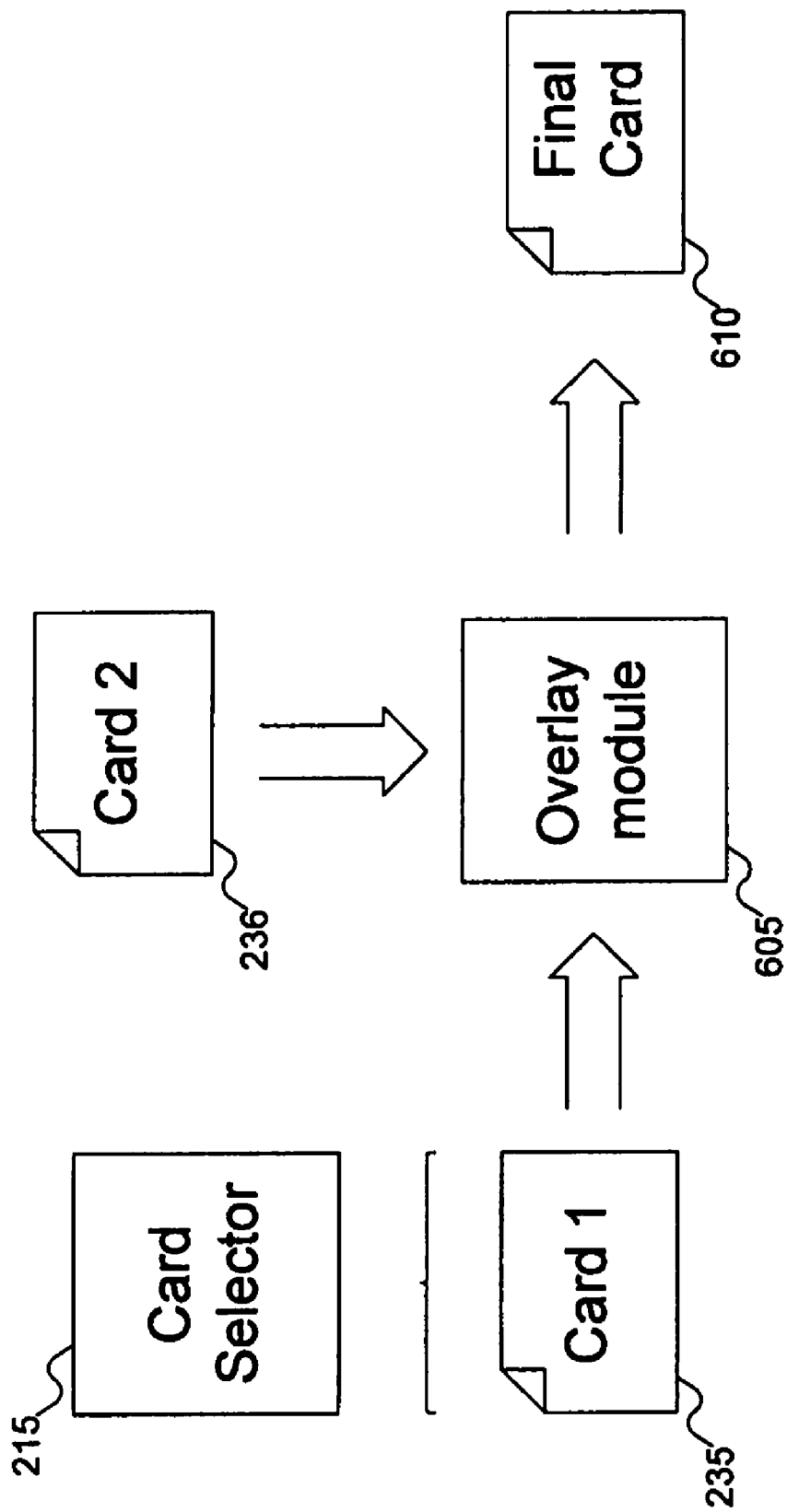
FIG. 6 illustrates a first example of an overlay module in accordance with certain implementations of the disclosed technology.

FIG. 6 shows a first example of an overlay module 605 in accordance with certain implementations of the disclosed technology. In the example, the card selector 215 is used to select the first information card 235 as the base card 235. In certain embodiments, the card selector 215 can present the user with all of the available information cards that can be used as a base card. Alternatively, the card selector 215 can automatically select the base card 235 (e.g., if the card selector 215 determines that the base card 235 was the same base card that was selected during the user's last interaction with the same relying party).

Once the card selector 215 selects the base card 235, an overlay module 605 determines whether an overlay card is to be applied to the base card 235. For example, the user may have indicated that he or she prefers to provide a mobile number rather than a home phone number when dealing with a particular relying party. Thus, the overlay module 605 can retrieve the first overlay card 236 and apply it to the base card 235.

The result is the final card 610, which typically represents a modified version of the base card 235 (e.g., the claim value for the phone number claim is now the user's mobile number instead of his or her home phone number). The final card 610 can then be used in the same manner for which the base card 235 was originally intended (e.g., to request a security token) but advantageously provides only the information the user wanted to use (e.g., mobile number instead of home phone number). In some embodiments, the final card 610 can represent a newly created card that can be stored for future transactions with the same relying party.

Figure 7:
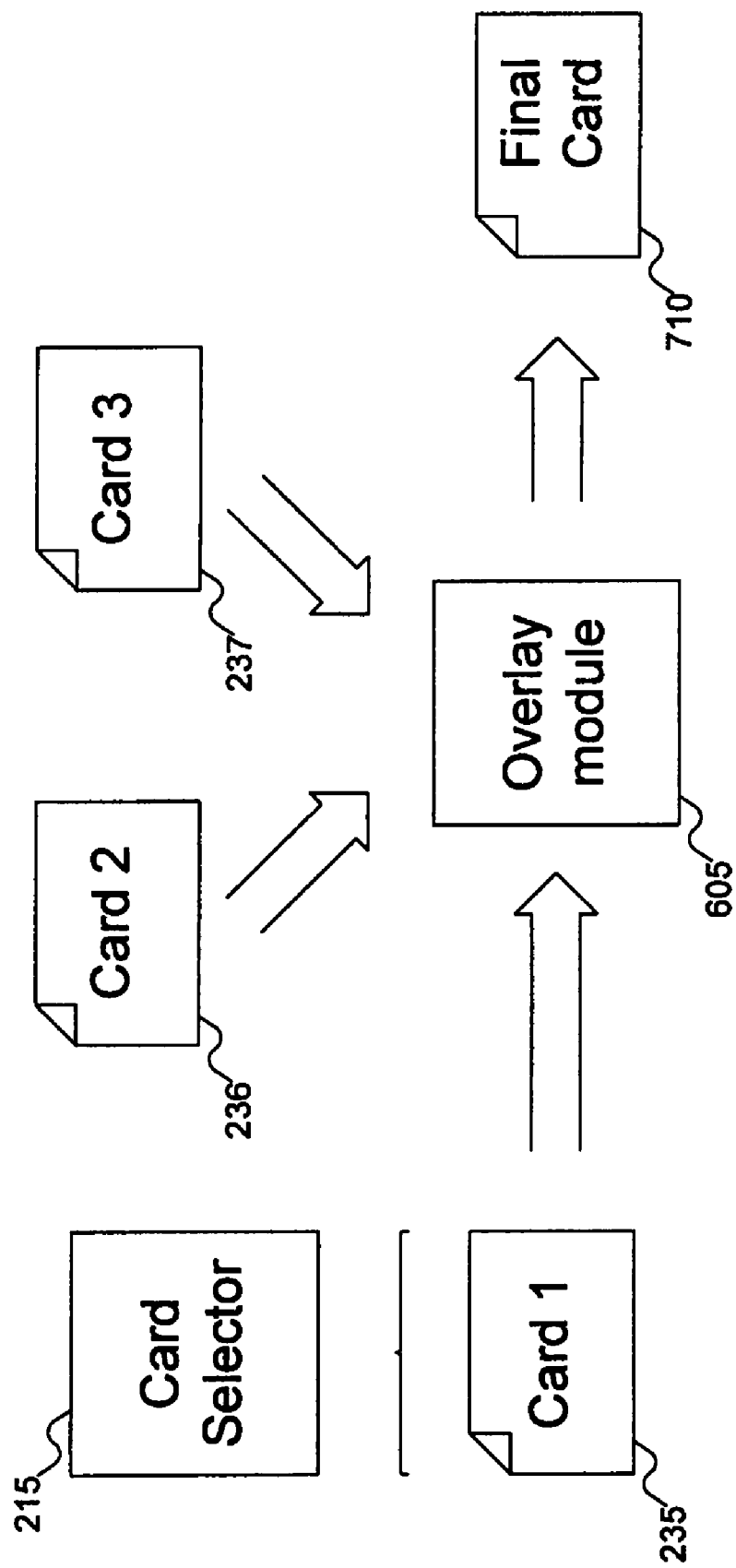
FIG. 7 illustrates a second example of the overlay module in accordance with certain implementations of the disclosed technology.

FIG. 7 shows a second example of the overlay module 605 in accordance with certain implementations of the disclosed technology. The second example as illustrated in FIG. 7 is similar to the first example as illustrated in FIG. 6 but has an important difference: whereas the latter involves only a single overlay card, the former involves the use of two overlay cards.

The card selector 215 can be used to select the first information card 235 as the base card 235, after which the overlay module 605 can determine whether an overlay card is to be applied to the base card 235. For example, the user may have indicated that he or she prefers to provide a mobile number and an alternate email address rather than a home phone number and primary email address when dealing with a particular relying party. Thus, the overlay module 605 can retrieve the first and second overlay cards 236 and 237, respectively, and apply both of them to the base card 235.

The result is the final card 610, which can be used in the same manner for which the base card 235 was originally intended but with information the user preferred (e.g., mobile number and alternate email address) instead of the "default" information (e.g., home phone number and primary email address). As with the final card 610 of FIG. 6, the final card 710 of FIG. 7 can represent a newly created information card (e.g., one that can be stored for future use).

Figure 8:
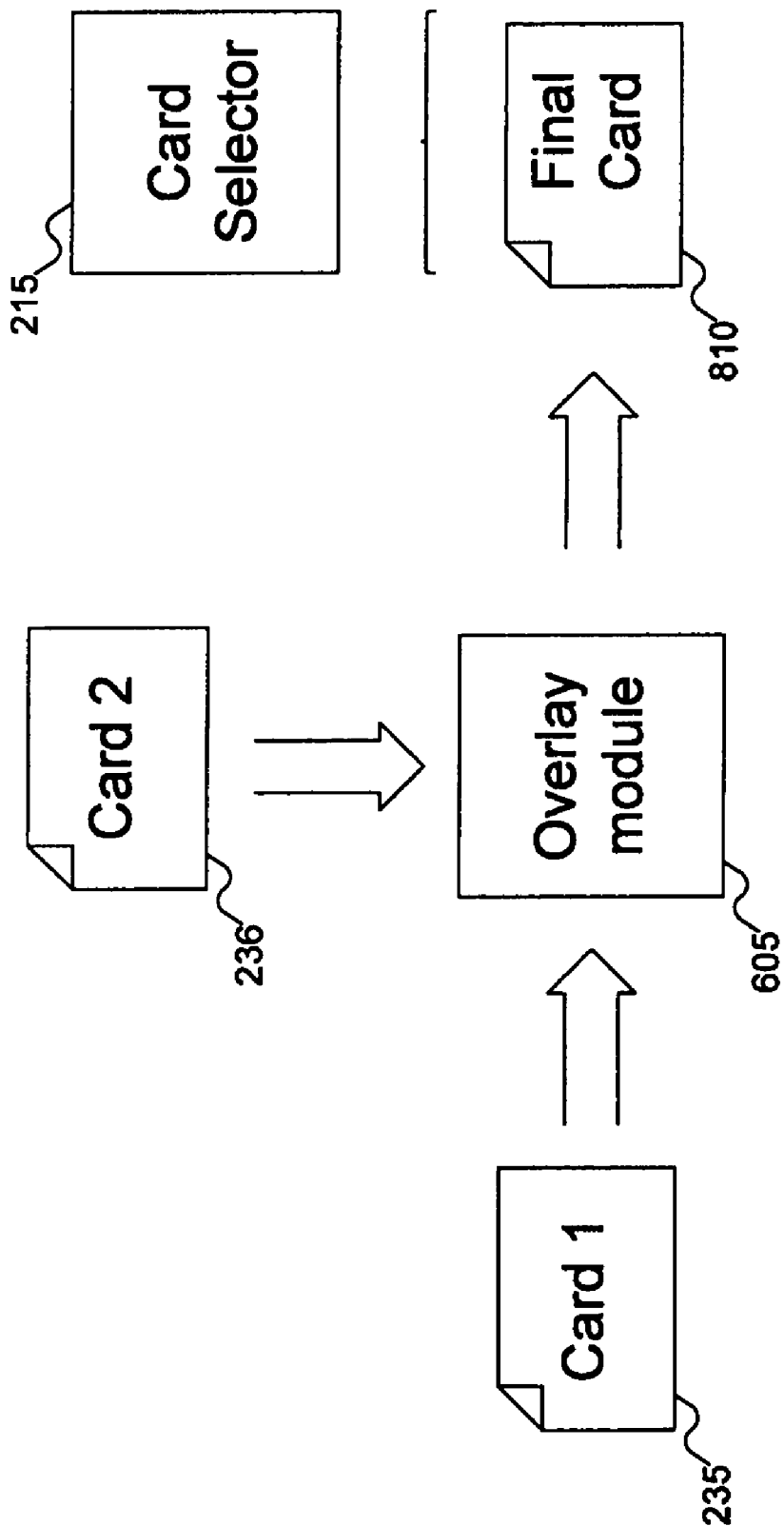
FIG. 8 illustrates a third example of the overlay module in accordance with certain implementations of the disclosed technology.

FIG. 8 shows a third example of the overlay module 605 in accordance with certain implementations of the disclosed technology. In the example, the overlay module 605 retrieves and applies the first overlay card 236 to the base card 235 before the card selector 215 is even involved. Once the overlay module 605 applies the first overlay card 236 to the base card 235, resulting in the final card 810, the card selector 215 can present the final card 810 to the user for selection (e.g., for authentication purposes).

Figure 9:
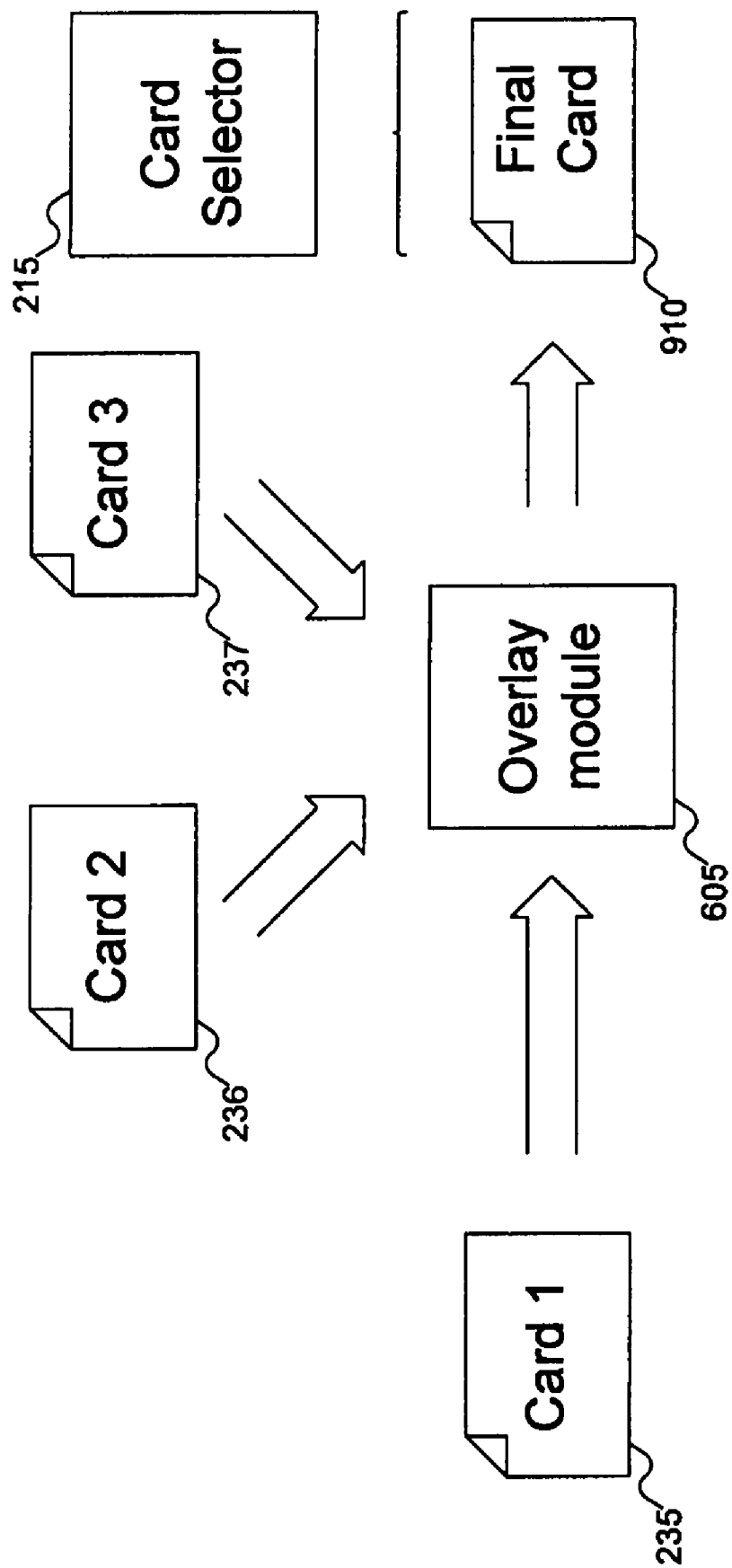
FIG. 9 illustrates a fourth example of the overlay module in accordance with certain implementations of the disclosed technology.

FIG. 9 shows a fourth example of the overlay module 605 in accordance with certain implementations of the disclosed technology. In the example, the overlay module 605 retrieves and applies the first and second overlay cards 236 and 237, respectively, to the base card 235, resulting in the final card 910. The card selector 215 can present the final card 910 to the user.

In alternative embodiments, the card selector 215 can present any number of final cards, each representing a different permutation of base card and overlay card(s). In the example, the overlay cards 236 and 237 can be applied to the base card 235 (e.g., the overlay cards 236 and 237 each have a base card identifier that identifies the base card 235). As such, there are up to four different final cards 910 that can be presented to the user: the base card 235 without an overlay, the base card 235 with the first overlay card 236 applied, the base card with the second overlay card 237 applied, and the base card 235 with both of the overlay cards 236 and 237 applied.

In certain embodiments, each possible final card 910 can be created prior to or in parallel with presenting the options to the user. Alternatively, the card selector 215 can merely present the options to the user and, once the user makes his or her choice, the card selector instructs the overlay module 605 to perform the requested action (e.g., apply the overlay cards 236 and 237 to the base card 235).

Figure 10:
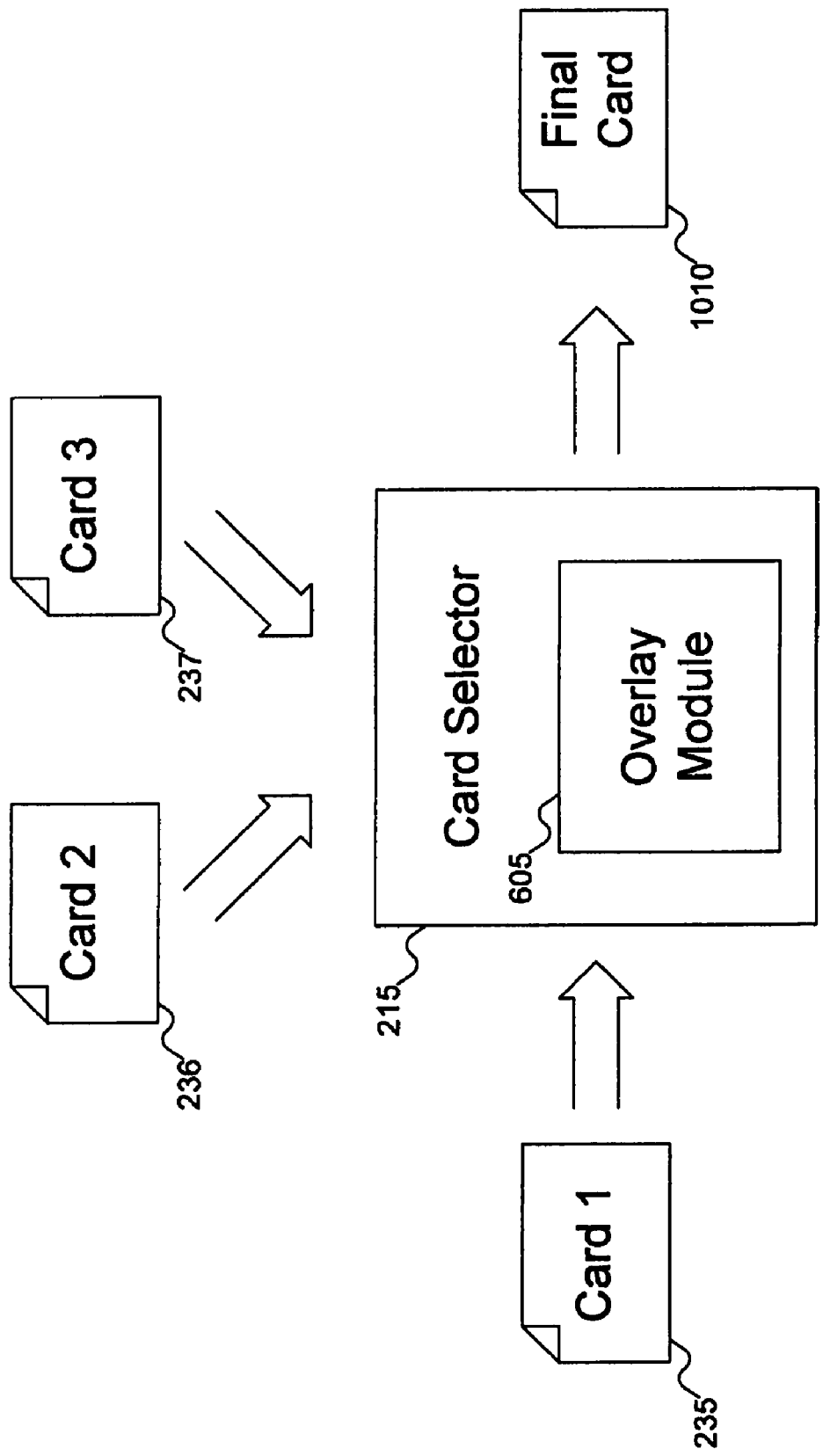
FIG. 10 illustrates an example of the overlay module incorporated within a card selector in accordance with certain implementations of the disclosed technology.

FIG. 10 shows an example of the overlay module 605 incorporated within the card selector 215 in accordance with certain implementations of the disclosed technology. In the example, a user can use the card selector 215 to designate the base card 235 and, if desired, one or more overlay cards such as the first and second overlay cards 236 and 237, respectively.

In situations where an information card is needed (e.g., for authentication purposes), the card selector 215 can present one or more information cards that can be used as a base card such as the base card 235. The card selector 215 can also present the user with one or more additional information cards that can be used as overlay cards (e.g., cards having a base card identifier identifying the presented base card) such as the first and second overlay cards 236 and 237, respectively.

For example, the card selector can provide additional icons or graphics for each presented base card that has at least one corresponding overlay card. In response to a user selecting an overlay icon for the base card 235, for example, the card selector 215 can present the first and second overlay cards 236 and 237, respectively, to the user. The card selector 215 can also present the overlay data to the user (e.g., in the card selector's detail view). Thus, in the example, the card selector 215 can advantageously allow the user to decide which, if any, of the overlay cards 236 and 237 he or she wishes to apply to the base card 235 (e.g., before sending the base card 235 to a relying party).

Exemplary Methods Involving the Use of an Overlay Card

Figure 11:
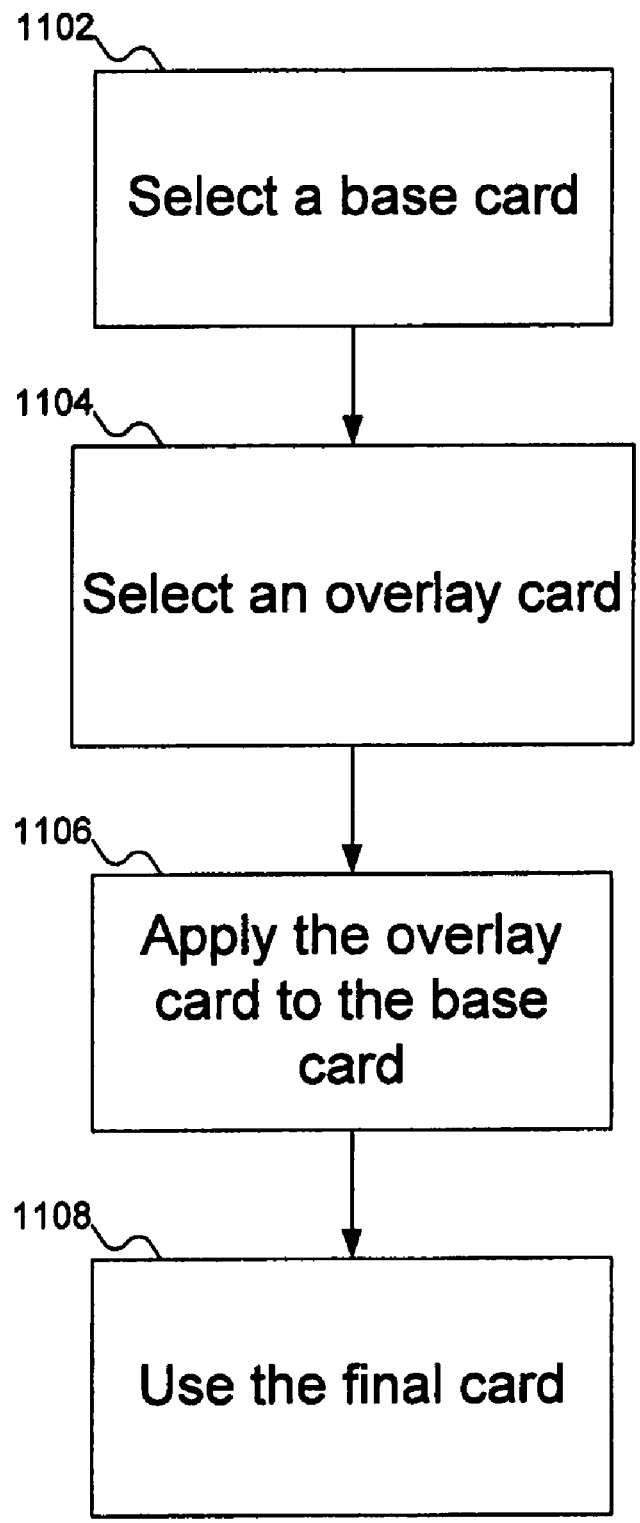
FIG. 11 illustrates a first example of a method of using an overlay card in accordance with certain implementations of the disclosed technology.

FIG. 11 shows a first example of a method of using an overlay card in accordance with certain implementations of the disclosed technology.

At 1102, a base card is selected (e.g., the base card 235 of FIG. 2). For example, a card selector (e.g., the card selector 215 of FIG. 2) can present a user with one or more information cards that can be used as a base card. In certain embodiments, the card selector presents the user with all of the user's information cards. Alternatively, the card selector can automatically choose the base card itself (e.g., if the user has consistently selected a particular card during previous interactions with the same relying party).

At 1104, an overlay card is selected (e.g., the first and second overlay cards 236 and 237, respectively, of FIG. 2). For example, the card selector can present the user with all of the information cards that can be used as overlay cards with the selected base card (e.g., each overlay card having a base card identifier that identifies the selected base card).

In certain embodiments where there is no overlay card associated with the base card, a virtual overlay card can be constructed. For example, consider a situation in which the base card does not completely satisfy a particular security policy. If only a certain amount of information is needed but is not presently available in any existing overlay card for the base card, the card selector can create a virtual overlay card that can be used as a "regular" overlay card.

At 1106, the selected overlay card is applied to the base card, resulting in a final card. For example, the card selector can take whatever information is contained in the overlay card and add it to the base card or, for claims that already have values in the base card, override the claim values with those in the overlay card. Alternatively, the card selector can refer to deltas stored in the overlay card to determine exactly which claims are to be added to or modified in the base card. In certain embodiments, the overlay card may specify certain claims to be removed from the base card, regardless of whether the overlay card contains any claim values for those claims.

The final card can be a modified version of the base card or a newly-created card, for example. If multiple overlay cards were selected, each selected overlay card is applied to the base card. For example, the first overlay card selected can be applied to the base card before the second overlay card selected is applied. The card selector itself can perform the application of the overlay card(s) to the base card (e.g., via an overlay module such as the overlay module 605 of FIG. 10). Alternatively, the overlay mechanism can be external to the card selector but work in connection with the card selector.

At 1108, the final card is used. For example, the final card can be used for the same purpose for which the original base card was selected (e.g., for authentication purposes).

Figure 12:
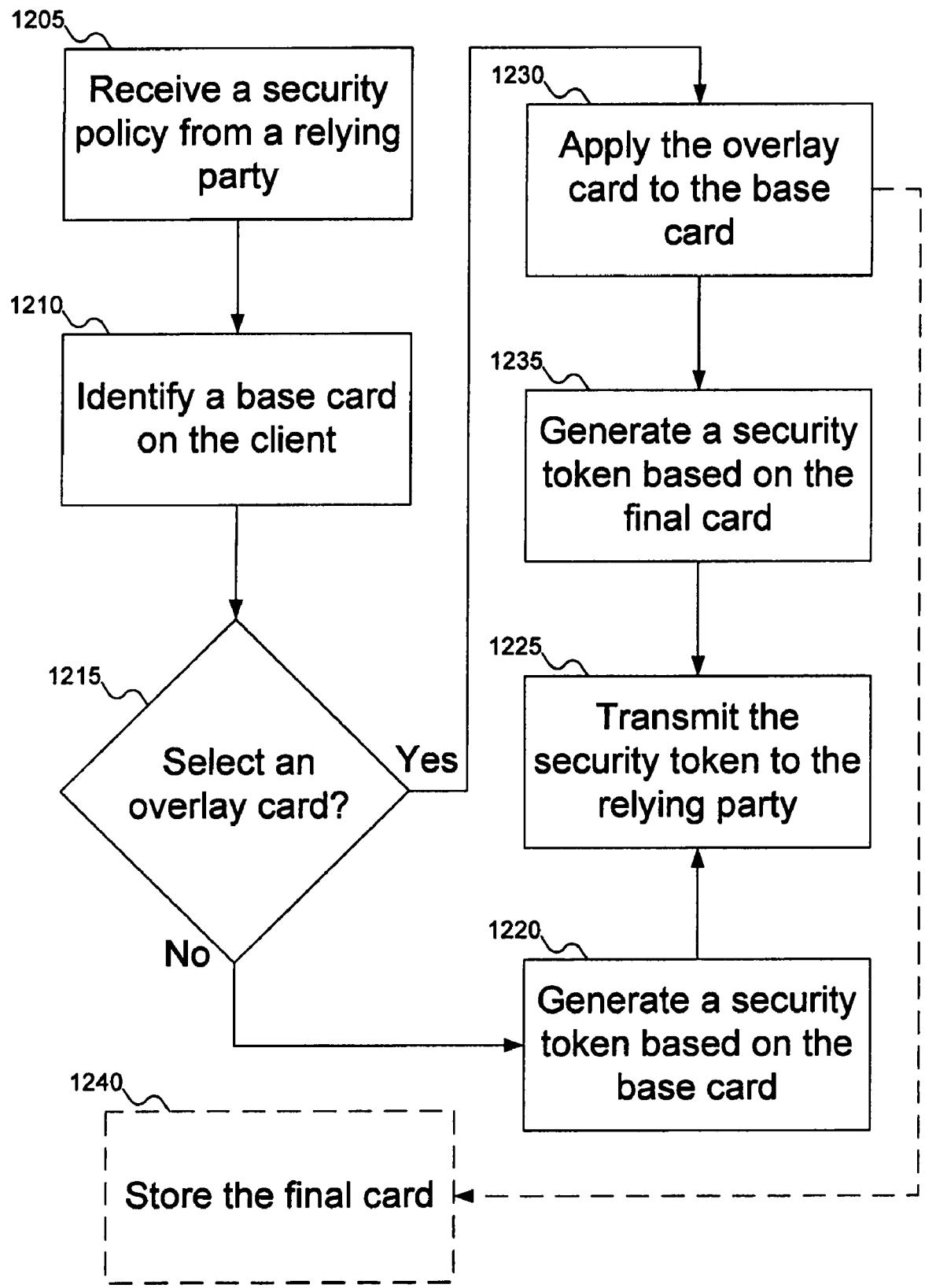
FIG. 12 illustrates a second example of a method of using an overlay card in accordance with certain implementations of the disclosed technology.

FIG. 12 shows a second example of a method of using an overlay card in accordance with certain implementations of the disclosed technology.

At 1205, a security policy is received from a relying party. A typical security policy is a summary of what information the relying party needs and how the information should be formatted, for example.

At 1210, a base card is identified on the client (e.g., the computer system 105 of FIG. 2). The base card can be selected automatically (e.g., by a card selector) or selected by a user (e.g., using a card selector) as described above.

At 1212, a determination is made as to whether an overlay card should be applied to the base card. For example, a card selector can determine whether there are any information cards that can be applied to the base card (e.g., information cards having a base card identifier that identifies the base card). If the card selector determines that one or more overlay cards are available, the card selector can present the overlay cards to the user. Alternatively, the card selector can automatically select one or more overlay cards (e.g., based on actions such as previous overlay card selections by the user). If there are no overlay cards available, processing can proceed directly to 1220.

In certain embodiments, the card selector can provide information regarding potential overlay cards in response to a user action. Upon presentation of the base card, for example, the user can move the pointer over a certain field (e.g., phone number) and, if there are any associated overlay cards containing different values for the field, the card selector can present the options to the user. For example, the card selector can either present the overlay card(s) available or present only the different value(s) for the field contained within the overlay card(s).

Alternatively, the user can right-click on a base card and, if there are any associated overlay cards, the card selector can present the overlay card(s) to the user. The card selector can also present a tree view showing a hierarchy of the overlay cards associated with the user's base card (e.g., where the base card is the top-most or bottom-most card, depending upon the hierarchical structure used).

At 1220, a security token can be generated based on the final card. Here, the final card is the base card itself since no overlay cards were applied to the base card. The generated security token can then by transmitted to the relying party, as shown at 1225.

At 1230, the overlay card(s) can be applied to the base card, resulting in a final card. In certain embodiments, the final card represents a modified version of the base card. For example, if the overlay card specifies the user's mobile number as his or her phone number but the base card specifies the user's home phone number instead, the home phone number can be replaced with the mobile number.

Alternatively, the final card can be a new information card created for the particular situation at hand (e.g., during interactions with a particular relying party) and stored, as shown at 1240. In certain embodiments, the final card itself is stored. Alternatively, a record of the combination used (e.g., identifiers for the base card and overlay card(s)) can be stored rather than the final card itself.

At 1235, a security token can be generated based on the final card (e.g., a modified version of the base card or a new card resulting from application of the overlay card(s) to the base card). The generated security token can then by transmitted to the relying party, as shown at 1225.

General Description of a Suitable Machine in Which Embodiments of the Disclosed Technology Can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   a base card storing a plurality of claims, wherein each of the plurality of claims comprises a claim type and a claim value;
   an overlay card storing an overlay claim, wherein the overlay claim comprises a claim type and a claim value; and
   an overlay module operable to apply the overlay card to the base card.

2. The apparatus of claim 1, further comprising an information card selector comprising the overlay module.

3. The apparatus of claim 1, wherein the overlay claim stored in the overlay card corresponds to one of the plurality of claims stored in the base card.

4. The apparatus of claim 3, wherein the overlay module is operable to apply the overlay card to the base card by overriding the claim value of the one of the plurality of claims stored in the base card with the claim value of the overlay claim stored in the overlay card.

5. The apparatus of claim 1, wherein the overlay card corresponds to a particular identity provider.

6. The apparatus of claim 1, wherein the overlay card corresponds to a particular relying party.

7. The apparatus of claim 1, further comprising another overlay card storing another overlay claim, wherein the other overlay claim comprises a claim type and a claim value.

8. The apparatus of claim 7, wherein the overlay module is operable to apply the other overlay card to the base card.

9. The apparatus of claim 1, wherein the claim value of the overlay claim stored in the overlay card is a null value.

10. The apparatus of claim 1, further comprising a final card resulting from an application of the overlay card to the base card by the overlay module.

11. A computer-implemented method, comprising:
    selecting a base card storing a plurality of claims, wherein each of the plurality of claims comprises a claim type and a claim value;
    selecting an overlay card storing an overlay claim, wherein the overlay claim comprises a claim type and a claim value; and
    applying the overlay card to the base card.

12. The computer-implemented method of claim 11, wherein applying the overlay card to the base card comprises combining the overlay claim with at least some of the plurality of claims stored in the base card.

13. The computer-implemented method of claim 11, wherein the overlay claim stored in the overlay card corresponds to one of the plurality of claims stored in the base card.

14. The computer-implemented method of claim 13, wherein applying the overlay card to the base card comprises replacing the claim value of the one of the plurality of claims stored in the base card with the claim value of the overlay claim stored in the overlay card.

15. The computer-implemented method of claim 11, wherein applying the overlay card to the base card is performed by an information card selector.

16. The computer-implemented method of claim 11, wherein applying the overlay card to the base card comprises, responsive to a claim removal instruction in the overlay card, removing at least one of the plurality of claims stored in the base card.

17. One or more tangible, computer-readable media storing computer-executable instructions that, when executed by a processor, perform the computer-implemented method of claim 11.

18. A tangible computer-readable medium storing instructions that, when executed by a processor, result in:
    presenting at least a first information card to a user for selection as a base card;
    presenting at least a second overlay card to a user for selection as an overlay card; and
    applying the overlay card to the base card.

19. The tangible computer-readable medium of claim 18, wherein applying the overlay card to the base card comprises modifying the base card pursuant to at least one piece of information stored in the overlay card.

20. The tangible computer-readable medium of claim 18, having stored thereon further instructions that, when executed by the machine, result in:
    storing information identifying the selected base card and the selected overlay card.

* * * * *